United States Patent [19]
LeGrange et al.

[11] Patent Number: 5,898,715
[45] Date of Patent: Apr. 27, 1999

[54] OPTICAL COMMUNICATION SYSTEM COMPRISING A CLADDING PUMPED FIBER LASER

[75] Inventors: Jane Deborah LeGrange, Princeton; Kenneth Lee Walker, New Providence, both of N.J.

[73] Assignee: Lucent Technologies Inc., Murray Hill, N.J.

[21] Appl. No.: 08/871,081

[22] Filed: Jun. 9, 1997

[51] Int. Cl.[6] .................................................. H01S 3/07
[52] U.S. Cl. .............................. 372/6; 385/127; 385/128
[58] Field of Search .................................. 372/6, 69, 70, 372/75; 385/15, 50, 51, 123, 126, 127, 128, 141, 144

[56] References Cited

U.S. PATENT DOCUMENTS

| | | | |
|---|---|---|---|
| 3,808,549 | 4/1974 | Maurer | 372/6 |
| 4,830,460 | 5/1989 | Goldenberg | 385/118 |
| 5,170,458 | 12/1992 | Aoyagi et al. | 385/127 |
| 5,530,710 | 6/1996 | Grubb | 372/6 |

OTHER PUBLICATIONS

Zenteno, L. "High–Power Double–Clad Fiber Lasers", *Journal of Lightwave Technology*, vol. 11, No. 9, pp. 1435–1446 (1993), Sep. 1993.

"Fiber Raman Lasers Emit at Many Wavelengths," by Grubb, S.G. et al., *Laser Focus World*, pp. 127–134 (Feb. 1996).

"Ytterbium–Doped Silica Fiber Lasers: Versatile Sources for the 1–1.2 $\mu$m Region", by Pask, H.M. et al., *IEEE Journal of Selected Topics in Quantum Electronics*, vol. 1, No. 1, pp. 2–13 (Apr. 1995).

*Primary Examiner*—John D. Lee
*Attorney, Agent, or Firm*—Scott J. Rittman

[57] ABSTRACT

An optical communication system comprising a light source, a cladding pumped fiber laser having a pump cladding, an optical fiber attached to the cladding pumped fiber laser, the optical fiber having a cladding and a protective coating, and an expedient that prevents substantial damage to the protective coating of the optical fiber upon transmission of at least 1 watt of residual light out of the pump cladding.

14 Claims, 2 Drawing Sheets

OPTICAL COMMUNICATION SYSTEM COMPRISING A CLADDING PUMPED FIBER LASER

BACKGROUND OF THE INVENTION

1. Field of the Invention

The invention relates to an optical communication system, specifically an optical communication system comprising a cladding pumped fiber laser.

2. Discussion of the Related Art

Recently, optical power from diode-laser arrays has been improved by using the arrays to pump a cladding pumped fiber, and in turn employing the output of the pumped fiber with the concomitant improvement. See, e.g., S. Grubb et al., "Fiber Raman lasers emit at many wavelengths," *Laser Focus World*, February 1996, at 127 and L. Zentano, "High-Power Double-Clad Fiber Lasers," *Journal of Lightwave Technology*, Vol. 11, No. 9, September 1993, the disclosures of which are herein incorporated by reference. Cladding pumped fiber lasers (i.e., the combination of a light source and a cladding pumped fiber) are advantageous in that they allow the coupling and magnification of light from high-power diode-laser arrays into a single mode fiber. Specifically, as reflected in FIG. 1, cladding pumped fiber lasers rely on a relatively large, separately light-guiding pump cladding 14 (i.e., outer waveguide) in the cladding pumped fiber 10, the cladding 14 surrounding a smaller doped (typically with a rare earth element) single-mode core 12. A light source, e.g., a diode-laser array, directs pump light into the pump cladding 14, and, advantageously, the primary pump-light loss mechanism is absorption of light into the core 12, where the amplification and lasing occurs. The core 12 has a much smaller cross-sectional area than the pump cladding 14, and, for a certain wattage of pump light, the energy per unit area in the core will thus be higher than in the pump cladding. Absorption of the pump light by the core thereby results in an increase in the brightness. The actual increase in brightness depends on the ratio of pump cladding area to core area—the higher the ratio, the greater the brightness increase. Through use of feedback elements such as dielectric coatings or Bragg gratings, laser power can be extracted from the single mode core and directed into an attached single mode optical fiber that transmits the lased light.

In a typical cladding pumped fiber 10, as shown (not to scale) in FIGS. 1 and 3, the pump cladding 14 is rectangular, having dimensions of about 100 by 360 $\mu$m. (In FIG. 3, the longer axis of the pump cladding 14 is oriented vertically.) Other pump cladding configurations are possible, such as that of now abandoned U.S. patent application Ser. No. 08/561,682, filed Nov. 22, 1995 (our Docket No. DiGiovanni 23), the disclosure of which is hereby incorporated by reference. The rare earth-doped core 12 is circular and has a diameter of about 5–10 $\mu$m. The pump cladding 14 is typically surrounded either with a single polymer layer, the layer acting both as a cladding and a protective coating, or with two layers, a cladding layer and a protective coating layer. FIG. 1 illustrates the latter. A polymer cladding 16 having a thickness of about 2 $\mu$m to about 30 $\mu$m, and a protective coating 18 having a thickness of about 30 $\mu$m to about 60 $\mu$m, surround the cladding 14. The pump cladding 14 is typically formed from silica, and the core 12 is typically formed from silica doped with rare earths such as neodymium, ytterbium, or erbium/ytterbium. The polymer cladding 16 is typically formed from a polymer having a relatively low index of refraction, e.g., a fluorinated polymer having an index of refraction of about 1.38. Typical protective coatings 18 include polymers such as acrylates, which have thermal stabilities around 100° C. (Thermal stability, as used herein, indicates the temperature above which a material experiences irreversible damage or structural change, as measured by the onset of weight loss in the material.)

In a typical single mode transmission fiber 20, shown (not to scale) in FIGS. 2 and 3, the core 22 is circular and has a diameter of about 5–10 $\mu$m, and is surrounded by a cladding 24 having a diameter of about 125 $\mu$m. The cladding 24 is surrounded by a protective coating 26, e.g., an acrylate, having a thickness of about 50 to about 70 $\mu$m. The core 22 of such a typical single mode fiber is doped silica, the dopant producing a relatively high index of refraction, typically about 1.467, and the cladding 24 is silica having a lower index of refraction, typically about 1.465. FIG. 3 shows a cross-sectional side view reflecting the approximate relationship when cladding pumped fiber 10 and single mode fiber 20 are spliced together. The Figure indicates the areas at which the pump cladding 14 tends to overlap the cladding 24 and protective coating 26 of the single mode fiber 20.

While good results have been obtained from cladding pumped fiber lasers, improvements in the overall systems containing such lasers are desired and sought.

SUMMARY OF THE INVENTION

The invention constitutes the recognition of and solution for a problem in optical communication systems that use a cladding pumped fiber laser. In a system containing a cladding pumped fiber laser, the cladding pumped fiber is typically spliced to a single mode optical fiber. It has been found that residual light from the pump cladding of the cladding pumped fiber, e.g., from a few hundred milliwatts to over a watt, is transmitted into the single mode fiber's cladding and/or protective coating. It is possible for this residual light to be directly transmitted into the protective coating of the optical fiber, or into the cladding of the optical fiber. Light transmitted into the single mode fiber's cladding is almost immediately directed into the protective coating because of the protective coating's higher refractive index. In many cases, this transmitted energy will vaporize or otherwise damage typical protective coatings found on single mode fiber and thereby affect the integrity of the entire optical communication system.

The system of the invention avoids this problem by providing an expedient that prevents substantial damage to the protective coating of the optical fiber upon transmission of at least 1 watt of residual light out of the pump cladding. (The term expedient includes any method or article that prevents such damage, whether part of, or external to, the fiber laser or optical fiber. Substantial damage means that the coating has been damaged, e.g., melted or partially or fully vaporized, to such an extent that the optical fiber components (e.g., the cladding) beneath the protective coating become exposed. The phrase "upon transmission of at least 1 watt" does not limit the invention to systems in which 1 watt or more of residual light is transmitted, does not mean that 1 watt of residual power is required for the system to function, and does not mean that the expedient will fail to prevent damage for residual light less than 1 watt. The phrase instead indicates that the expedient is capable, at a minimum, of preventing substantial damage for amounts of residual light up to and including 1 watt, and that, depending on the expedient, substantial damage will be prevented for residual light above 1 watt.) In one embodiment, the expedient is a material that constitutes the protective coating on an optical fiber, e.g., a single mode optical fiber, the material capable of withstanding the residual light without incurring substantial damage. In another embodiment, the expedient is an article located at the attachment of the cladding pumped fiber and the optical fiber, the article capable of absorbing and dissipating at least a portion of the residual light such that a 50–70 µm thick conventional protective coating having a thermal stability of about 100° C. remains free of substantial damage. The optical communication system of the invention is thereby able to take advantage of desirable properties offered by a cladding pumped fiber laser while avoiding problems resulting from residual light transmitted from the pump cladding into an attached optical fiber.

DETAILED DESCRIPTION OF THE INVENTION

Figure 1:
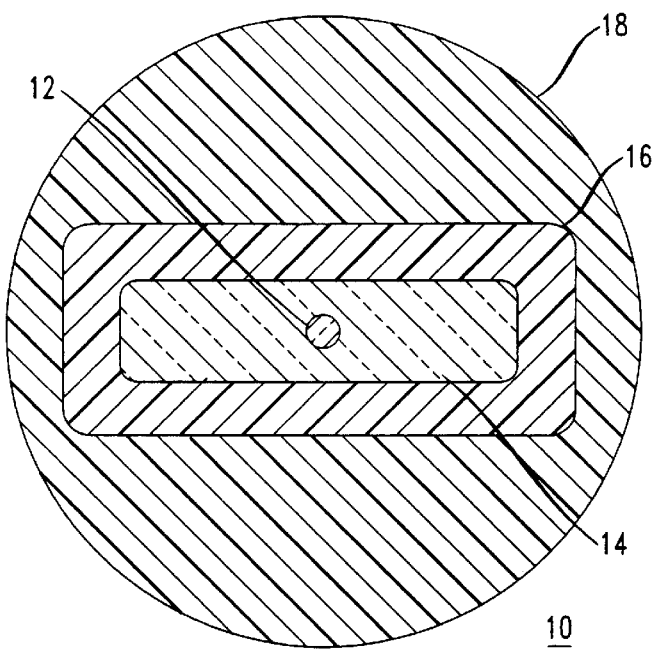
FIG. 1 shows a cross-sectional end view of a typical cladding pumped fiber.
Figure 2:
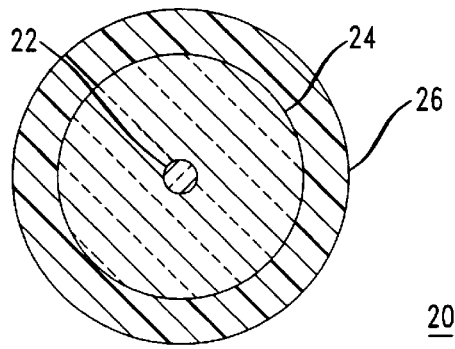
FIG. 2 shows a cross-sectional end view of a typical single mode transmission fiber.
Figure 3:
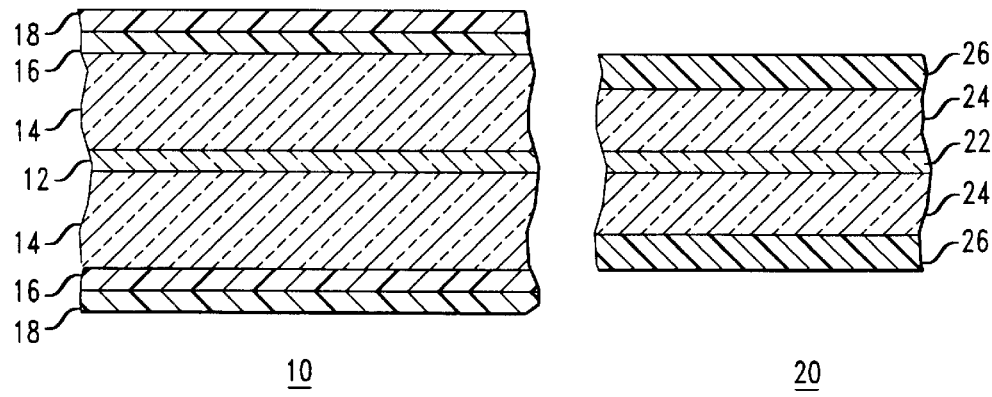
FIG. 3 shows a cross-sectional side view of the cladding pumped fiber and single mode transmission fiber of FIGS. 1 and 2, respectively.

It is apparent from the dimensions above and from FIG. 3 that in a typical case the cross-sectional area of the pump cladding 14 of a cladding pumped fiber 10 of a cladding pumped fiber laser will overlap the cross-sectional area of the cladding 24 and/or the protective coating 26 of an attached single mode fiber 20. It has been found that this overlap creates significant problems in operation of an optical communication system. Specifically, a cladding pumped fiber is typically designed to have a length that results in absorption of about 85–95% of the light that passes into the pump cladding from the light source, e.g. a diode-laser array. For current cladding pumped fiber lasers, which have powers ranging from about 2 to about 20 watts, it is possible for the other 5–15% to result in a residual pump light ranging, for example, from a few hundred milliwatts to over one watt. Higher outputs are contemplated for cladding pumped fiber lasers, and such outputs will result in residual light of up to about 3 watts.

The residual light passes from the pump cladding into the single mode fiber's cladding and/or protective coating at the interconnection between the two fibers. And, because the protective coating of the optical fiber typically has a higher refractive index than the cladding, any light passing into the fiber's cladding will be almost immediately directed into the fiber's protective coating. Thus, even if all the residual light passes into the fiber's cladding, the light will be directed into the fiber's protective coating. The residual wattage from current fiber lasers is enough to substantially damage, even vaporize, the typical acrylate protective coatings of single mode fibers. The actual length over which this damage occurs will depend on variables such as the wattage of the residual light and the material of the protective coating. Not all heat-induced change in the protective coating will necessarily result in exposure of the fiber's interior components.

The optical communication system of the invention provides an expedient that prevents substantial damage to the protective coating of the optical fiber upon transmission of at least 1 watt of residual light out of the pump cladding. Expedient includes any method or article that prevents such damage, as reflected in the embodiments below. For example, it is possible for the expedient to be part of the cladding pumped fiber laser or the optical fiber, to be attached to the fiber laser or optical fiber, or to be external to the fiber laser or optical fiber. For currently contemplated cladding pumped fiber lasers, the expedient advantageously will be capable of preventing substantial damage for up to about 3 watts of residual power. As powers of cladding pumped fiber lasers increase, however, higher residual powers will be encountered, and the expedient will have to be adjusted accordingly.

In one embodiment, the problem of residual light is avoided by using a single mode fiber having a protective coating formed from a material that can withstand at least 1 watt of light transmitted from the pump cladding into the single mode fiber's cladding and/or protective coating without incurring substantial damage (hereafter referred to as the heat-resistant material). (The term material encompasses a single material as well as mixtures or combinations of materials, as reflected below.)

In some cases, the heat-resistant material's ability to withstand the residual light transmitted from the pump cladding is measured by the material's thermal stability. Advantageously the heat-resistant material should be thermally stable up to about 200° C. Thermal stability alone, however, is not suitable in all cases for determining the ability of the heat-resistant material to withstand the transmitted light. For example, it is possible for the heat-resistant material to be a combination of a metal sleeve, e.g., copper, over a conventional polymer protective coating that has a thermal stability of only 100° C. Even though the thermal stability of the polymer is relatively low, it is possible for the metal to adequately conduct and dissipate as heat the transmitted residual light. (Conduct and dissipate indicates that the metal conducts the residual light as heat and dissipates the heat, e.g., by convection from the metal's surface.)

Possible heat-resistant materials include metal elements and alloys, high thermal stability polymers, and metal/polymer combinations. Suitable metals include gold (thermally stable to about 750° C.), aluminum (thermally stable to about 500° C.), and copper. Suitable high thermal stability polymers include polyimides (thermally stable to about 300° C.), epoxides, polyetheretherketone (PEEK), and Teflon™. The protective coating formed from the heat-resistant material must withstand the residual light transmitted from the pump cladding while also providing the ordinary protective function of a protective coating. The coating should also have a refractive index greater than that of the cladding of the fiber.

The protective coating formed from the heat-resistant material is advantageously disposed on the single mode fiber over a length of at least about 5 cm from the point where the low index coating of the cladding fiber laser ends. It is possible for the remaining length of the fiber to have a protective coating of the same heat-resistant material or a more conventional material. The required length of a protective coating formed from the heat-resistant material will depend on the residual power transmitted from the cladding pumped fiber laser and on the particular heat-resistant material utilized. The thickness of the protective coating formed from the heat-resistant material will also vary depending on the particular heat-resistant material and the residual power. In addition, thickness and length are related in that a thinner protective coating formed from a heat-resistant material will typically need to be disposed over a longer distance than a thicker coating of the same material. Generally, in this embodiment of the invention, a protective coating formed from a metal heat-resistant material (not a metal/polymer combination) will have a thickness of a few μm to about 20 μm, and a protective coating formed from a polymeric heat-resistant material will have a thickness of about 30 to about 60 μm.

In another embodiment of the invention, the expedient that prevents damage caused by the residual light is an article located at the attachment of the cladding pumped fiber and an optical fiber. The article conducts and dissipates at least a portion of the heat generated by the residual light transmitted from the pump cladding to prevent substantial damage to the optical fiber's protective coating. In particular, the article advantageously prevents substantial damage to a conventional protective coating, e.g., a 50–70 μm protective coating having a thermal stability of about 100° C. Any suitable article that provides this function is sufficient, provided the article does not interfere with operation of the optical system. Again, given the contemplated power of future cladding pumped fiber lasers, it is anticipated that the article will have to conduct and dissipate up to about 3 watts of light transmitted from the pump cladding.

Figure 4A:
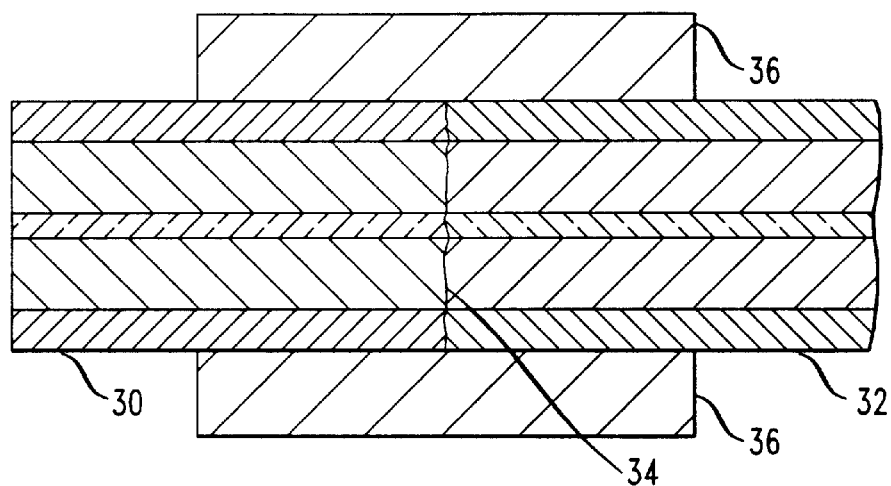
FIGS. 4A and 4B show an embodiment of the invention.
Figure 4B:
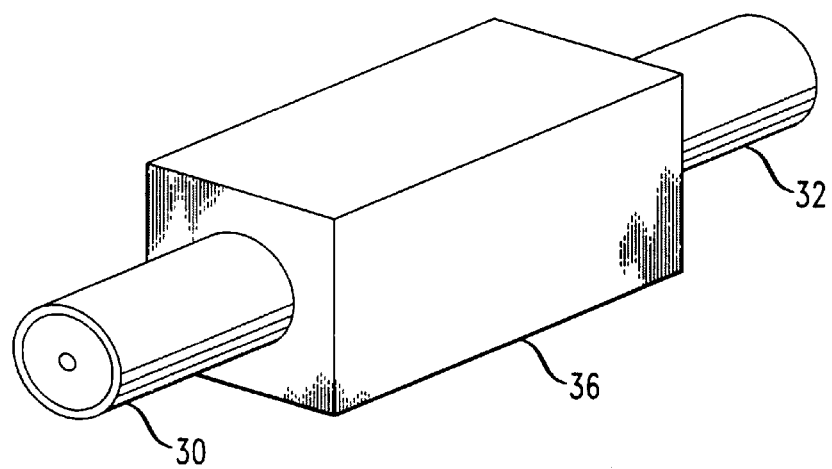

The article is advantageously formed from metal having thermal properties suitable for conducting and dissipating the residual light as heat. Examples include copper and aluminum. It is possible for such an article to be used in the system of the above embodiment, i.e., in combination with a single mode fiber having a protective coating formed from a material capable of withstanding at least 1 watt of residual light. One example of an article of this second embodiment is a metal block located at the point of attachment between the cladding pumped fiber and the optical fiber, the block acting as a heat sink to absorb and dissipate the transmitted power. See, e.g., FIGS 4A and 4B, which show a cladding pumped fiber laser 30 connected to a transmission fiber 32 by a splice 34. At the splice 34, is located an article, in particular a metal block 36, that provides such properties. It is possible for the metal block to have a groove that mechanically supports the cladding pumped fiber and/or optical fiber at the point of attachment. In addition, where the cladding pumped fiber or optical fiber has a metal or metal/polymer protective coating, the metal block also provides a solderable surface.

Examples of optical communication systems in which cladding pumped fiber lasers are capable of use are discussed in co-assigned U.S. Pat. Nos. 5,050,949, 5,058,976, 5,115,338, and 5,237,576, the disclosures of which are hereby incorporated by reference.

The optical communication system of the invention is able to take advantage of desirable properties offered by a cladding pumped fiber laser while avoiding potential problems resulting from damage to a conventional protective coating of a transmission fiber caused by residual light transmitted into the coating from the pump cladding.

EXAMPLE 1.

A fiber without a central single mode core (coreless), with the geometry of a cladding pumped fiber was prepared. Specifically, the coreless fiber contained a circular silica region with a diameter of 125 μm, corresponding to the diameter of a pump cladding in a cladding pumped fiber laser. The coreless fiber was spliced to an acrylate-coated single mode fiber. The single mode fiber had a core with a diameter of 8.3 μm, surrounded by a cladding having a diameter of 125 μm. The acrylate coating surrounding the cladding and had a diameter of 250 μm. The cross-sectional area of the coreless fiber therefore overlapped the cladding of the single mode fiber. The coreless fiber was used instead of a cladding pumped fiber laser to allow all the light transmitted through the fiber to be passed into the attached single mode fiber. One watt of light at 807 nm was transmitted through the coreless fiber, and resulted in substantial vaporization of the acrylate coating on the single mode fiber for a length of about 1–2 cm from the laser/fiber splice.

EXAMPLE 2.

A single mode fiber having the same core and cladding dimensions as Example 1, but with a 15 μm thick, gold protective coating over the cladding, was spliced to the same coreless fiber used in Example 1. The gold coating withstood the 1.0 watt of light at 807 nm with no damage.

Other embodiments of the invention will be apparent to those skilled in the art from consideration of the specification and practice of the invention disclosed herein.

What is claimed is:

1. An optical communication system comprising:
   a light source;
   a cladding pumped fiber laser comprising a pump cladding;
   an optical fiber attached to the cladding pumped fiber laser, the optical fiber comprising a cladding and a protective coating; and
   an expedient that prevents substantial damage to the protective coating of the optical fiber upon transmission of at least 1 watt of residual light out of the pump cladding.

2. The optical communication system of claim 1, wherein the optical fiber is a single mode fiber.

3. The optical communication system of claim 2, wherein the expedient is a material constituting the protective coating, the material capable of withstanding the at least 1 watt of residual light without incurring substantial damage.

4. The optical communication system of claim 3, wherein the material comprises a metal, a polymer, or both a metal and a polymer.

5. The optical communication system of claim 4, wherein the material comprises a metal selected from gold, aluminum, and copper.

6. The optical communication system of claim 4, wherein the material comprises a polymer having a refractive index higher than the refractive index of the cladding of the optical fiber and selected from polyimides, polyetheretherketone, Teflon™, and epoxides.

7. The optical communication system of claim 4, wherein the material comprises a metal and a polymer.

8. The optical communication system of claim 3, further comprising a metal support at the attachment between the cladding pumped fiber laser and the optical fiber.

9. The optical communication system of claim 3, wherein the material constituting the protective coating is thermally stable up to about 200° C.

10. The optical communication system of claim 1, wherein the expedient is an article disposed at the attachment between the cladding pumped fiber laser and the optical fiber, the article capable of conducting and dissipating as heat at least a portion of the residual light to prevent substantial damage to the protective coating of the optical fiber.

11. The optical communication system of claim 10, wherein the article prevents substantial damage to a 50–70 μm thick protective coating having a thermal stability of about 100° C.

12. The optical communication system of claim 10, wherein the article comprises a metal.

13. The optical communication system of claim 12, wherein the metal is selected from copper and aluminum.

14. The optical communication system of claim 10, wherein the article comprises a metal block having a groove that supports the cladding pumped fiber laser, the optical fiber, or both the laser and the fiber.

* * * * *